United States Patent
Hoshino et al.

(10) Patent No.: US 9,696,895 B2
(45) Date of Patent: Jul. 4, 2017

(54) PORTABLE TERMINAL DEVICE, LUMINANCE CONTROL METHOD, AND LUMINANCE CONTROL PROGRAM

(71) Applicant: Panasonic Intellectual Property Management Co., Ltd., Osaka (JP)

(72) Inventors: Masashi Hoshino, Tokyo (JP); Masaaki Harada, Osaka (JP)

(73) Assignee: PANASONIC INTELLECTUAL PROPERTY MANAGEMENT CO,. LTD., Osaka (JP)

(*) Notice: Subject to any disclaimer, the term of this patent is extended or adjusted under 35 U.S.C. 154(b) by 0 days.

(21) Appl. No.: 14/733,159

(22) Filed: Jun. 8, 2015

(65) Prior Publication Data
US 2015/0268810 A1 Sep. 24, 2015

Related U.S. Application Data

(63) Continuation of application No. PCT/JP2013/006710, filed on Nov. 15, 2013.

(30) Foreign Application Priority Data

Dec. 10, 2012 (JP) ................................ 2012-269576

(51) Int. Cl.
*G09G 5/02* (2006.01)
*G06F 3/0485* (2013.01)
(Continued)

(52) U.S. Cl.
CPC .......... *G06F 3/0485* (2013.01); *G06F 1/3265* (2013.01); *G06F 3/017* (2013.01);
(Continued)

(58) Field of Classification Search
None
See application file for complete search history.

(56) References Cited

U.S. PATENT DOCUMENTS 7,683,918 B2 * 3/2010 Bohan ................... G06F 1/1626
345/156
8,595,643 B2 * 11/2013 Horagai ................ G06F 3/0485
345/684

(Continued)

FOREIGN PATENT DOCUMENTS

JP 2006-171311 A 6/2006
JP 2007-150894 A 6/2007

(Continued)

OTHER PUBLICATIONS

International Search Report for Application No. PCT/JP2013/006710 dated Feb. 18, 2014.

*Primary Examiner* — Frank Chen
(74) *Attorney, Agent, or Firm* — Pearne & Gordon, LLP

(57) ABSTRACT

A portable terminal apparatus receives an operation instructing that an image displayed on a screen be scrolled, and moves the image in the instructed direction. The apparatus comprising: one or more memories, and circuitry. The circuitry which, in operation, judges whether or not a display image at an end of scrolling is included in a region of the screen during scrolling and determines, to be a control target region, a region judged not to include the display image at the end of the scrolling of the region of the screen; and performs control of lowering brightness of the control target region on the display image during scrolling.

10 Claims, 13 Drawing Sheets

(51) Int. Cl.
*G09G 5/10* (2006.01)
*G09G 5/34* (2006.01)
*H04W 52/02* (2009.01)
*G06F 3/0488* (2013.01)
*G06F 1/32* (2006.01)
*G06F 3/01* (2006.01)

(52) U.S. Cl.
CPC ............ *G06F 3/0488* (2013.01); *G09G 5/10* (2013.01); *G09G 5/34* (2013.01); *G09G 5/346* (2013.01); *H04W 52/0267* (2013.01); *G06F 2200/1637* (2013.01); *G09G 2320/0626* (2013.01); *G09G 2330/022* (2013.01); *Y02B 60/1242* (2013.01); *Y02B 60/50* (2013.01)

(56) References Cited

U.S. PATENT DOCUMENTS

| | | | | |
|---|---|---|---|---|
| 8,601,389 | B2 * | 12/2013 | Schulz | G06F 3/0482 345/156 |
| 8,957,847 | B1 * | 2/2015 | Karakotsios | G06F 3/013 345/156 |
| 2005/0251760 | A1 * | 11/2005 | Sato | G06F 3/023 715/856 |
| 2010/0281374 | A1 * | 11/2010 | Schulz | G06F 3/0482 715/723 |
| 2011/0063248 | A1 * | 3/2011 | Yoon | G06F 3/0485 345/174 |
| 2012/0026194 | A1 * | 2/2012 | Wagner | G06F 3/0485 345/647 |
| 2013/0141435 | A1 * | 6/2013 | Cho | G06T 15/50 345/426 |
| 2014/0139560 | A1 * | 5/2014 | Jung | G09G 5/10 345/690 |
| 2014/0150630 | A1 * | 6/2014 | Juszkiewicz | G10H 1/44 84/626 |

FOREIGN PATENT DOCUMENTS

| | | |
|---|---|---|
| JP | 2009-187467 A | 8/2009 |
| JP | 2009-253333 A | 10/2009 |
| JP | 2011-101296 A | 5/2011 |
| JP | 2011-242557 A | 12/2011 |
| JP | 2012-168890 A | 9/2012 |

* cited by examiner

PORTABLE TERMINAL DEVICE, LUMINANCE CONTROL METHOD, AND LUMINANCE CONTROL PROGRAM

TECHNICAL FIELD

The present invention relates to a portable terminal apparatus, a brightness control method and a brightness control program for controlling brightness of an image.

BACKGROUND ART

The size and resolution of screens (display sections) for portable terminal apparatuses such as smartphones and tablets have been increasing. With this increase, the proportion of power consumption of image display to the total power consumption of a portable terminal apparatus is increasing. For this reason, how to reduce the power consumption of image display for portable terminal apparatuses has been discussed.

For example, Patent Literature (hereinafter, referred to as "PTL") 1 discloses a technique for solving such a problem. A portable terminal apparatus of PTL 1 reduces brightness of an image corresponding to at least one of predetermined periods before and after an image is changed. The portable terminal apparatus of PTL 1 thereby achieves a reduction in power consumption.

CITATION LIST

Patent Literature

PTL 1
Japanese Patent Application Laid-Open No. 2011-242557

SUMMARY OF INVENTION

Technical Problem

However, the portable terminal apparatus of PTL 1 is intended to control brightness when the whole image is changed at a time, and the problem of this technique is that it cannot control brightness of an image when the image is changed while moving in a predetermined direction, that is, during a "scroll displaying."

An object of the present invention is to reduce power consumption during scroll displaying.

Solution to Problem

A portable terminal apparatus according to an aspect of the present invention is an apparatus that receives an operation to instruct scrolling of an image displayed on a screen, that moves the image toward an instructed direction and that displays the image, the apparatus including: a determining section that determines whether or not a display image at an end of scrolling is included in a region of the screen during scrolling and that determines, to be a control target region, a region determined not to include the display image at the end of the scrolling of the region of the screen; and a changing section that performs control of lowering brightness of the control target region on the display image during scrolling.

A brightness control method according to an aspect of the present invention is a method performed by an apparatus that receives an operation to instruct scrolling of an image displayed on a screen, that moves the image toward an instructed direction and that displays the image, the method including: determining whether or not a display image at an end of scrolling is included in a region of the screen during scrolling and determining, to be a control target region, a region determined not to include the display image at the end of the scrolling of the region of the screen; and performing control of lowering brightness of the control target region on the display image during scrolling.

A brightness control program according to an aspect of the present invention is program causing a computer of an apparatus to execute processing, the apparatus being an apparatus that receives an operation to instruct scrolling of an image displayed on a screen, that moves the image toward an instructed direction and that displays the image, the processing including: determining whether or not a display image at an end of scrolling is included in a region of the screen during scrolling and determining, to be a control target region, a region determined not to include the display image at the end of the scrolling of the region of the screen; and performing control of lowering brightness of the control target region on the display image during scrolling.

Advantageous Effects of Invention

The present invention can reduce power consumption during scroll displaying.

DESCRIPTION OF EMBODIMENTS

Hereinafter, embodiments of the present invention will be described in detail with reference to the accompanying drawings.

Embodiment 1

Embodiment 1 will be described.

<Configuration of Portable Terminal Apparatus 100>

Figure 1:
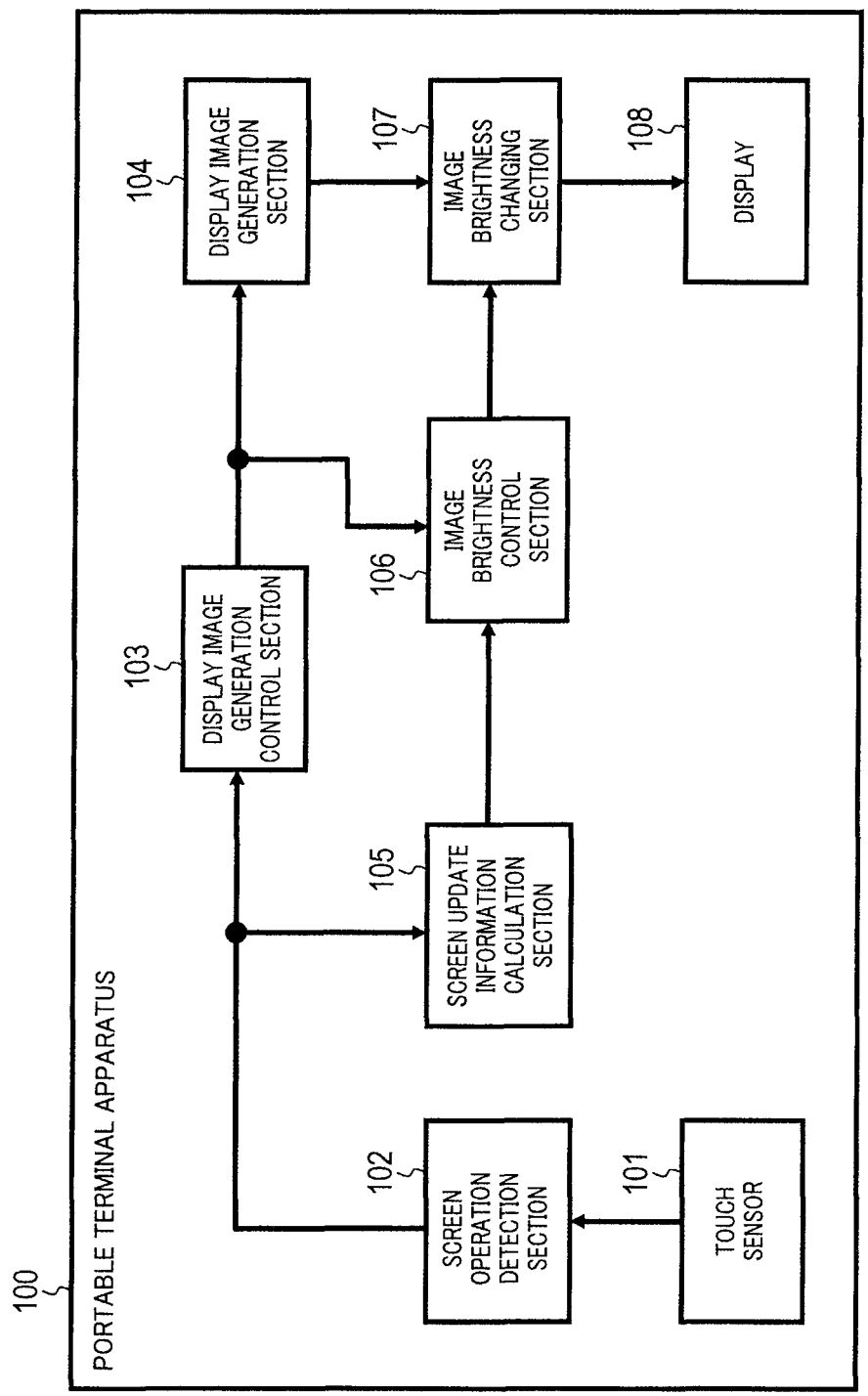
FIG. 1 is a block diagram illustrating a configuration example of a portable terminal apparatus according to Embodiment 1 of the present invention.

First, a configuration of portable terminal apparatus 100 according to Embodiment 1 of the present invention will be described. FIG. 1 is a block diagram illustrating a configuration example of portable terminal apparatus 100.

In FIG. 1, portable terminal apparatus 100 includes touch sensor 101, screen operation detection section 102, display image generation control section 103, display image generation section 104, screen update information calculation section 105, image brightness control section 106, image brightness changing section 107 and display 108. Touch sensor 101 and display 108 constitute a touch panel. Portable terminal apparatus 100 is a portable type information processing apparatus such as a smartphone, tablet or personal computer.

Touch sensor 101 receives a contact operation performed by a user. The contact operation refers to an operation of the user of touching display 108 with his/her finger or stylus pen. Note that the contact operation referred to here is an operation involving quick motion (e.g., gesturing operation, flicking operation). Upon receiving a contact operation, touch sensor 101 sends contact operation information to screen operation detection section 102. The contact operation information is information indicating a position at which a contact operation starts (contact start position) and a position at which the contact operation ends (contact end position).

Screen operation detection section 102 detects what kind of contact operation is performed based on the contact operation information. Suppose that the contact operation detected here is a flicking operation, for example. The flicking operation is an operation that the user flicks a screen by sliding his/her finger over an image in a direction in which the user desires the image to be scrolled. Note that the screen refers to display 108.

Upon detecting a flicking operation, screen operation detection section 102 detects that the indicated operation is scroll displaying and detects the direction of the scroll displaying (hereinafter referred to as "scroll direction"). Suppose that the scroll direction detected here is a downward direction, for example. Scroll displaying is an operation in which an image moves in a predetermined direction.

Screen operation detection section 102 calculates a speed when the finger with which the flicking operation was performed leaves from the screen (hereinafter referred to as "flicking speed"). Screen operation detection section 102 then sends the screen operation information to display image generation control section 103 and screen update information calculation section 105. The screen operation information is information indicating that the operation indicated by the flicking operation is scroll displaying in a downward direction and indicating a flicking speed.

Display image generation control section 103 calculates a moving distance every time the screen is updated (also referred to as "frame rate") based on the screen operation information. The moving distance refers to a distance by which an image displayed on a screen at the time of a flicking operation moves by scrolling. The frame rate which is a unit for calculating a moving distance is determined beforehand at a certain interval.

Figure 2:
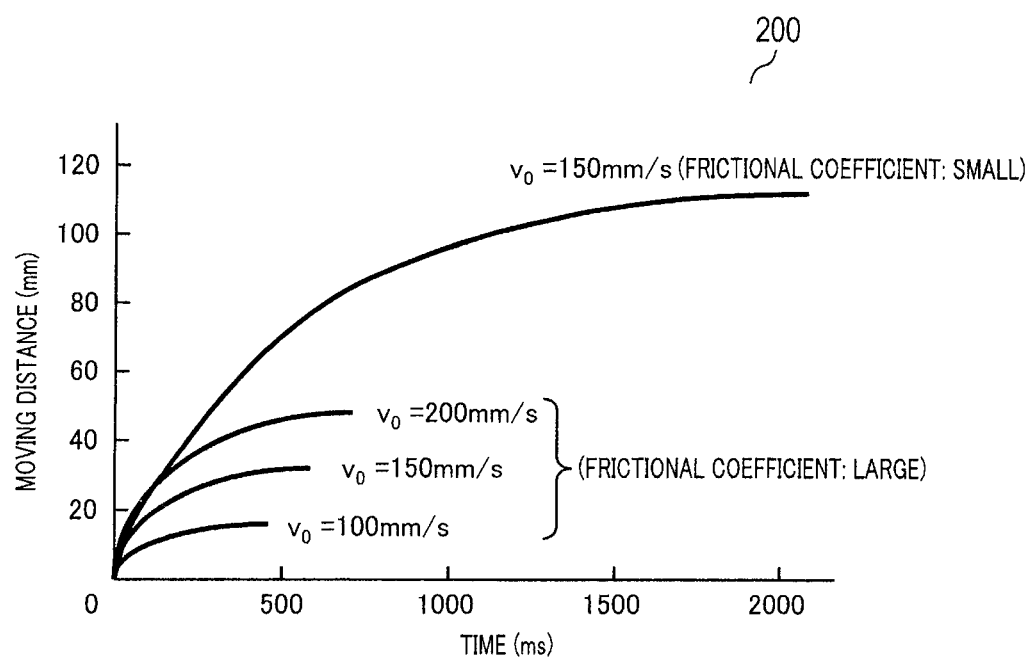
FIG. 2 is a graph illustrating an example of a model function according to Embodiment 1 of the present invention.

Here, a model function will be described which is used when display image generation control section 103 calculates a moving distance. The model function is defined through software control by an OS (operating system) or application. FIG. 2 is a graph illustrating an example of the model function. In graph 200 in FIG. 2, the model function is defined to have a relationship represented by a curve showing a moving distance per time for each flicking speed $V_0$. The time referred to here is a time elapsed after the finger with which flicking operation was performed leaves from the screen. The moving distance is a distance by which an image moves by scrolling for the duration of the time. A frictional coefficient is one of variables determined by the system or application. According to graph 200, the smaller the frictional coefficient, the greater the moving distance becomes, and the greater the flicking speed $V_0$, the greater the moving distance becomes. Display image generation control section 103 calculates a moving distance every time the screen is updated based on the model function shown in graph 200 and a flicking speed indicated by the screen operation information.

Display image generation control section 103 sends moving distance information indicating a moving distance every time the screen is updated to display image generation section 104 and image brightness control section 106.

Display image generation section 104 generates an image to be displayed in the next frame based on the moving distance indicated by the moving distance information. Display image generation section 104 then sends the image generated to image brightness changing section 107.

Screen update information calculation section 105 calculates a total moving distance based on the screen operation information. The total moving distance refers to a distance by which the image displayed on a screen at the time of flicking operation has moved from start to end of the scrolling. Screen update information calculation section 105 calculates the total moving distance based on the model function shown in graph 200 shown in FIG. 2 and a flicking speed indicated by the screen operation information. In FIG. 2, the total moving distance is a moving distance corresponding to the rightmost end of the curve. Screen update information calculation section 105 sends total moving distance information indicating the total moving distance to image brightness control section 106. Note that, the time corresponding to the rightmost end of the curve is referred to as "total moving time." The total moving time is a time required from start to end of the scrolling. Screen update information calculation section 105 can also calculate the total moving time.

Image brightness control section 106 determines a control target region based on a difference between the moving distance information and the total moving distance information. The control target region is a region where control of lowering brightness of an image is performed (hereinafter referred to as "brightness control region").

Image brightness control section 106 determines a brightness control region as follows, for example. First, image brightness control section 106 determines whether or not an image displayed on a screen at an end of scrolling (hereinafter referred to as "end-time image") enters (also referred to as "is included;" the same shall apply hereinafter) the region of the screen based on a difference between a moving distance at a predetermined frame rate and a total moving distance. When the determination result shows that the end-time image does not enter the region of the screen, image brightness control section 106 determines the whole region of the screen to be a brightness control region. On the other hand, when the determination result shows that part of the end-time image enters the region of the screen, image brightness control section 106 determines the region except the part of the incoming end-time image of the whole region of the screen to be a brightness control region. When the determination result shows that the whole end-time image enters the region of the screen, image brightness control section 106 determines that there is no brightness control region. Image brightness control section 106 sends brightness control information indicating the determined brightness control region and a predetermined brightness lowering rate to image brightness changing section 107. Image brightness control section 106 performs such a series of operations every time the screen is updated.

Image brightness changing section 107 performs brightness control processing on the image generated in display image generation section 104 to change a brightness value in units of pixels based on the brightness control information. For example, image brightness changing section 107 performs signal processing of multiplying a pixel value of the brightness control region by a gain value corresponding to the brightness lowering rate. The above-described pixel value is a gradation value of each pixel component in RGB or YUV format, for example. Image brightness changing section 107 then sends the image subjected to the brightness control processing to display 108. By this means, image brightness changing section 107 lowers the brightness of the image of the brightness control region every time the screen is updated.

Display 108 displays the image subjected to the brightness control processing in image brightness changing section 107. For example, a light-emitting display is applicable to display 108. As the light-emitting display, for example, an organic EL display is applicable. The organic EL display enables brightness control in units of pixel gradation values and in units of pixels (or in units of pixel blocks). Display 108 may also be a liquid crystal display. When display 108 is a liquid crystal display, image brightness changing section 107 instructs display 108 to lower the brightness of a backlight corresponding to the brightness control region.

The configuration of portable terminal apparatus 100 has been described so far.

<Operation of Portable Terminal Apparatus 100>

Figure 3:
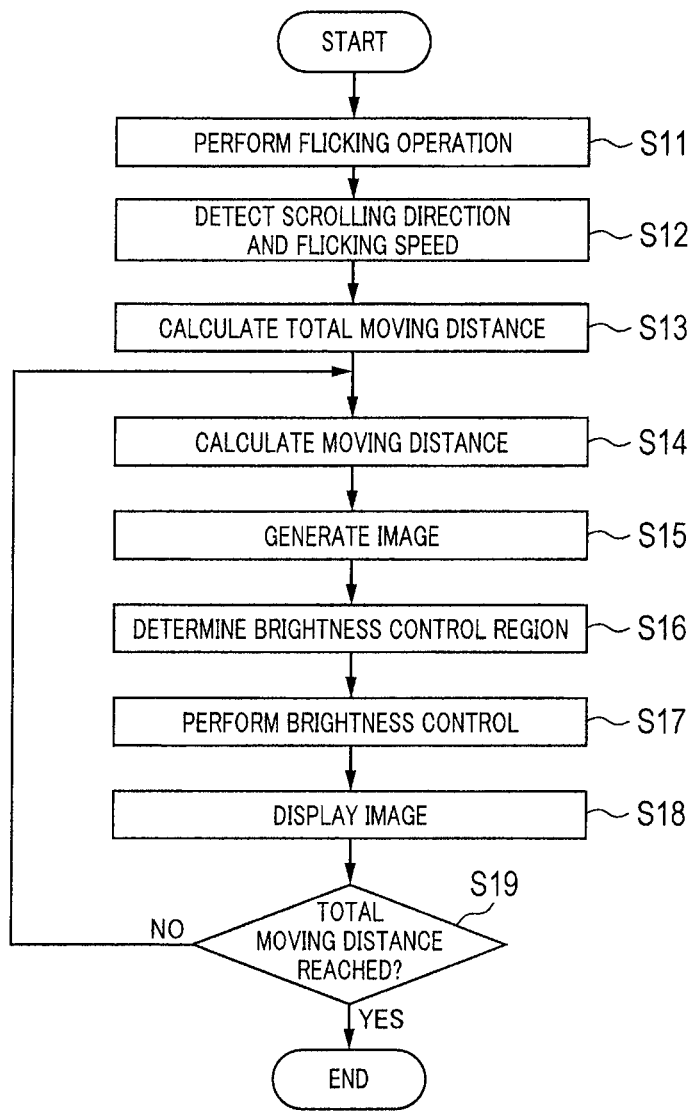
FIG. 3 is a flowchart illustrating an operation example of the portable terminal apparatus according to Embodiment 1 of the present invention.
Figure 4:
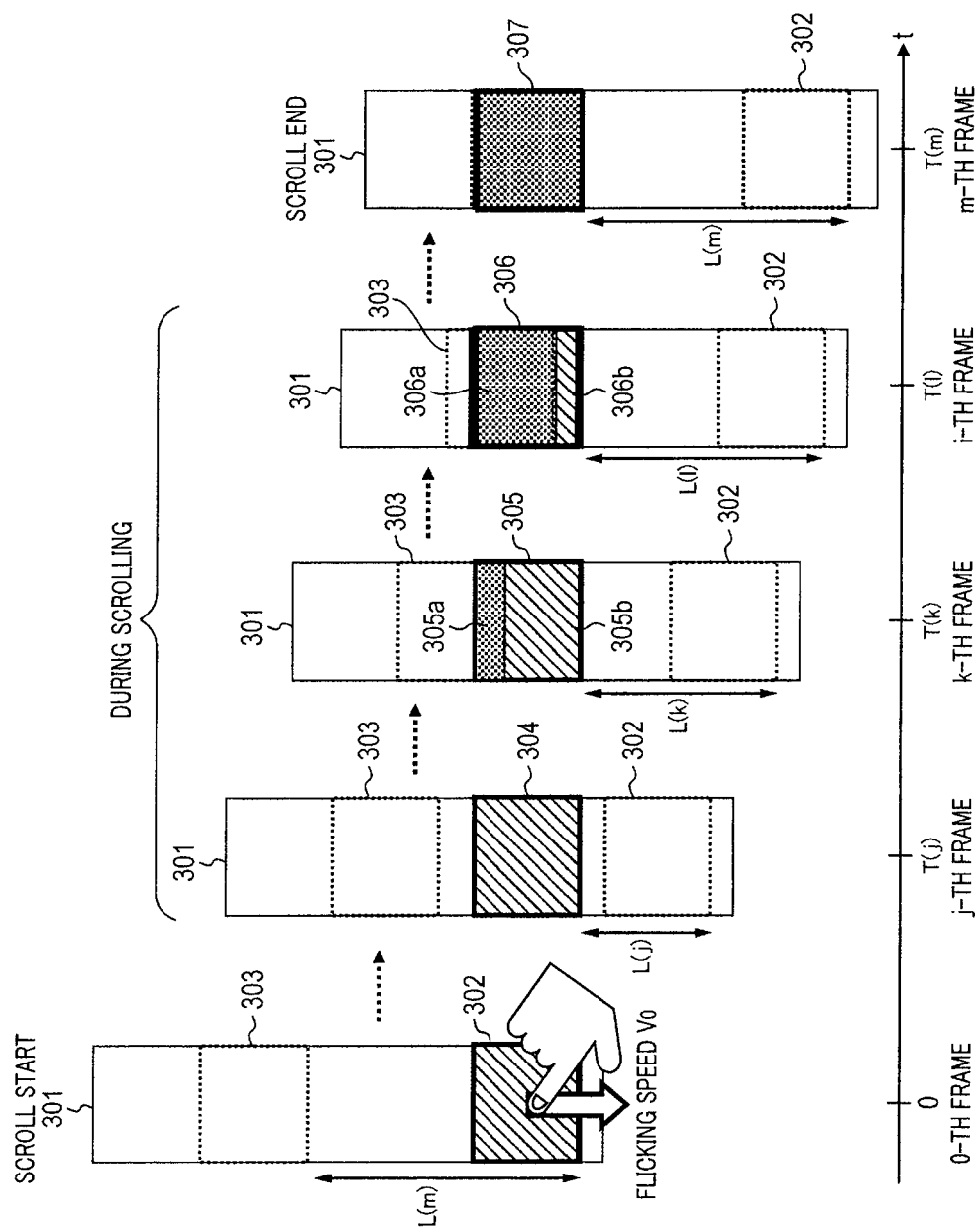
FIG. 4 is a diagram illustrating an image transition example during scroll displaying according to Embodiment 1 of the present invention.

Next, an operation example of portable terminal apparatus 100 will be described. FIG. 3 is a flowchart illustrating an operation example of portable terminal apparatus 100. FIG. 4 is a diagram illustrating image examples every time the screen is updated from start to end of scroll displaying. Note that FIG. 4 shows a case of scroll displaying in a downward direction.

In step S11, the user performs a flicking operation. This flicking operation is, for example, an operation to instruct execution of scroll displaying in the downward direction. An image at a point in time at which this flicking operation is performed is shown in a 0-th frame in FIG. 4. Total image 301 is a total content image of a web page or the like. Start-time image 302 is an image displayed on the whole screen at a start of scroll displaying. A solid frame around start-time image 302 shows a display region of the whole screen (display 108). End-time image 303 is an image displayed on the whole screen instead of start-time image 302 at an end of scroll displaying. Upon receiving the above-described flicking operation, touch sensor 101 sends contact operation information indicating position information on a contact start position to a contact end position to screen operation detection section 102.

In step S12, screen operation detection section 102 detects a scroll direction and a flicking speed. That is, screen operation detection section 102 detects that the flicking operation is an instruction on scroll displaying and that the scroll direction is a downward direction based on the position information of the contact operation information on the contact start position to the contact end position. Screen operation detection section 102 also detects flicking speed $V_0$. Screen operation detection section 102 then sends screen operation information indicating an instruction of executing scroll displaying in the downward direction and a flicking speed to display image generation control section 103 and screen update information calculation section 105.

In step S13, screen update information calculation section 105 calculates a total moving distance based on the flicking speed indicated by the screen operation information and a predetermined model function (e.g., graph 200 shown in FIG. 2). For example, screen update information calculation section 105 calculates a total moving distance Lm as shown in the 0-th frame in FIG. 4. The total moving distance Lm is a distance by which start-time image 302 and end-time image 303 move from start to end of the scrolling. Screen update information calculation section 105 sends the total moving distance information indicating the calculated total moving distance Lm to image brightness control section 106.

In step S14, display image generation control section 103 calculates a moving distance L every time the screen is updated based on the flicking speed indicated by the screen operation information and the predetermined model function (e.g., graph 200 shown in FIG. 2). When the frame rate is defined as 60 frames/sec, for example, display image generation control section 103 calculates the moving distance in units of 1/60 sec. Here, suppose that the time units corresponding to the frame rate are T(j), T(k), T(l) and T(m), for example. Display image generation control section 103 calculates a moving distance L(j) by inputting time T(j) and flicking speed $V_0$ in graph 200, for example. Likewise, display image generation control section 103 calculates a moving distance L(k) corresponding to time T(k), moving distance L(l) corresponding to time T(l) and moving distance L(m) corresponding to time T(m). Hereinafter, T(j), T(k), T(l), T(m), L(j), L(k), L(l) and L(m) will be denoted as Tj, Tk, Tl, Tm, Lj, Lk, Ll and Lm respectively.

A moving distance Lj is a distance by which start-time image 302 and end-time image 303 move after a lapse of time Tj from the scroll start as shown in a j-th frame in FIG. 4. A moving distance Lk is a distance by which start-time image 302 and end-time image 303 move after a lapse of time Tk from the scroll start as shown in a k-th frame in FIG. 4. A moving distance Ll is a distance by which start-time image 302 and end-time image 303 move after a lapse of time Tl from the scroll start as shown in an l-th frame in FIG. 4. A moving distance Lm is a distance by which start-time image 302 and end-time image 303 move after a lapse of time Tm from the scroll start as shown in an m-th frame in FIG. 4. Note that, since the time Tm is a time at which scrolling ends, the moving distance Lm corresponds to a total moving distance.

Display image generation control section 103 sends moving distance information indicating the moving distances Lj, Lk, Ll and Lm to image brightness control section 106 and display image generation section 104.

In step S15, upon receiving the moving distance information, display image generation section 104 generates images to be displayed on a screen every time the screen is updated. That is, display image generation section 104 generates images to be displayed on the screen based on the moving distances Lj, Lk, Ll and Lm, respectively. For example, display image generation section 104 generates images 302, 304, 305, 306 and 307 shown in FIG. 4 and sends the images to image brightness changing section 107. Here, although the moving distances Lj, Lk, Ll and Lm from display image generation control section 103 are assumed to be moving distances from the start of scrolling, there may also be moving distances from the last display image every time the screen is updated.

In step S16, image brightness control section 106 compares the total moving distance Lm indicated by the total moving distance information with the moving distances Lj, Lk, Ll and Lm indicated by the moving distance information and determines a brightness control region.

For example, in the case of the j-th frame, screen brightness control section 106 compares the total moving distance Lm with the moving distance Lj and determines whether or not end-time image 303 enters the region of the screen. As shown in FIG. 4, end-time image 303 in the j-th frame does not enter the region of the screen. Thus, image brightness control section 106 determines the whole region of the screen to be the brightness control region. As a result, image 304 generated by display image generation section 104 as a whole is controlled to low brightness.

For example, in the case of the k-th frame, screen brightness control section 106 compares the total moving distance Lm with the moving distance Lk and determines whether or not end-time image 303 enters the region of the screen. As shown in FIG. 4, in the k-th frame, part of end-time image 303 enters the region of the screen. Region 305a indicates a region of the whole region of the screen that part of end-time image 303 enters. Region 305b indicates a region other than region 305a of the whole region of the screen. Thus, image brightness control section 106 determines region 305b to be the brightness control region. As a result, of image 305 generated in display image generation section 104, the image of region 305b is controlled to low brightness and the image of region 305a is controlled to high brightness.

For example, in the case of the l-th frame, screen brightness control section 106 compares the total moving distance Lm with the moving distance Ll and determines whether or not end-time image 303 enters the region of the screen. As shown in FIG. 4, in the l-th frame, part of end-time image 303 enters the region of the screen. Region 306a indicates a region of the whole region of the screen that part of end-time image 303 enters. Region 306b indicates a region other than region 306a of the whole region of the screen. Thus, image brightness control section 106 determines region 306b to be the brightness control region. As a result, of image 306 generated in display image generation section 104, the image of region 306b is controlled to low brightness and the image of region 306a is controlled to have high brightness.

For example, in the case of the m-th frame, screen brightness control section 106 compares the total moving distance Lm with the moving distance Lm and determines whether or not end-time image 303 enters the region of the screen. As shown in FIG. 4, in the m-th frame, end-time image 303 enters the whole region of the screen. Thus, since whole end-time image 303 matches the whole region of the screen, image brightness control section 106 determines that there is no brightness control region. As a result, image 307 generated in display image generation section 104 as a whole is controlled to have high brightness.

Image brightness control section 106 sends brightness control information indicating the brightness control regions every time the screen is updated and the predetermined brightness lowering rate to image brightness changing section 107.

In step S17, image brightness changing section 107 performs brightness control on the image generated in display image generation section 104 every time the screen is updated based on the brightness control information. For example, image brightness changing section 107 controls all images 302 and 304 to low brightness. For example, image brightness changing section 107 performs control on image 305 so that the image of region 305b is controlled to have low brightness and the image of region 305a is controlled to have high brightness. On the other hand, for example, image brightness changing section 107 performs control on image 306 so that the image of region 306b is controlled to have low brightness and the image of region 306a is controlled to have high brightness. Image brightness changing section 107 controls the whole image of image 307 to have high brightness.

Image brightness changing section 107 sends the images subjected to brightness control processing to display 108 every time the screen is updated.

In step S18, display 108 displays the images subjected to the brightness control processing in image brightness changing section 107 every time the screen is updated.

In step S19, steps S14 to S18 are repeated until the moving distance L reaches the total moving distance Lm.

The operation of portable terminal apparatus 100 has been described so far.

Thus, portable terminal apparatus 100 reduces brightness of images other than end-time image 303 of the images displayed on the screen during scroll displaying. In this way, portable terminal apparatus 100 can reduce power consumption during scroll displaying. To the user, images other than end-time image 303 are estimated to have poor visibility due to scroll displaying and have a low degree of attention. Thus, even when portable terminal apparatus 100 reduces brightness of images other than end-time image 303, this will not impair the convenience of the user.

Embodiment 2

Embodiment 2 of the present invention will be described. The present embodiment is different from Embodiment 1 in that brightness control is performed on an image on a whole screen based on a scrolling speed.

<Configuration of Portable Terminal Apparatus 700>

Figure 5:
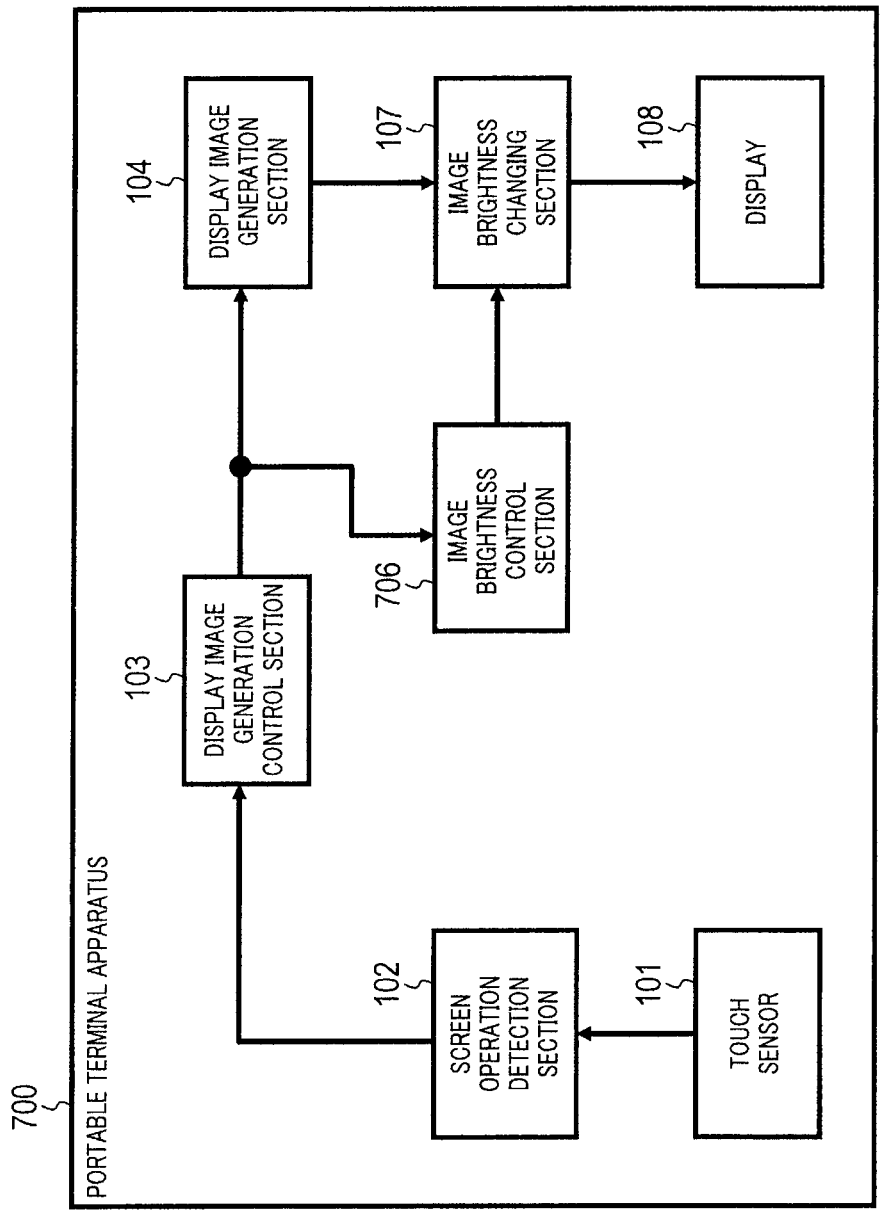
FIG. 5 is a block diagram illustrating a configuration example of a portable terminal apparatus according to Embodiment 2 of the present invention.

First, a configuration of portable terminal apparatus 700 according to Embodiment 2 of the present invention will be described. FIG. 5 is a block diagram illustrating a configuration example of portable terminal apparatus 700.

Portable terminal apparatus 700 is different from portable terminal apparatus 100 in FIG. 1 in that it does not include screen update information calculation section 105 and includes image brightness control section 706 instead of image brightness control section 106. Since the configuration except image brightness control section 706 is the same as that of portable terminal apparatus 100, the description thereof will be omitted hereinafter.

Just like image brightness control section 106 in FIG. 1, image brightness control section 706 receives moving distance information indicating a moving distance every time the screen is updated from display image generation control section 103. Note that, the moving distance information in the present embodiment includes a time corresponding to a moving distance. The time referred to here is a time that elapses after the finger by which a flicking operation was performed leaves from a screen as described in Embodiment 1.

Image brightness control section 706 calculates a speed of scrolling (hereinafter referred to as "scrolling speed") based on the moving distance and time indicated by the moving distance information. Image brightness changing section 706 instructs image brightness changing section 107 to perform brightness control on an image displayed on a whole screen according to the scrolling speed. For example, image brightness changing section 706 instructs image brightness changing section 106 to reduce brightness as the scrolling speed increases. Image brightness changing section 107 performs brightness control on the image on the whole screen based on the instruction from image brightness control section 706.

Since brightness control in the present embodiment is performed on the image on the whole screen, display 108 may not be a light-emitting display. Display 108 may be applied to brightness control of a backlight of an LCD (liquid crystal display), for example.

The configuration of portable terminal apparatus 700 has been described so far.

<Operation of Portable Terminal Apparatus 700>

Figure 6:
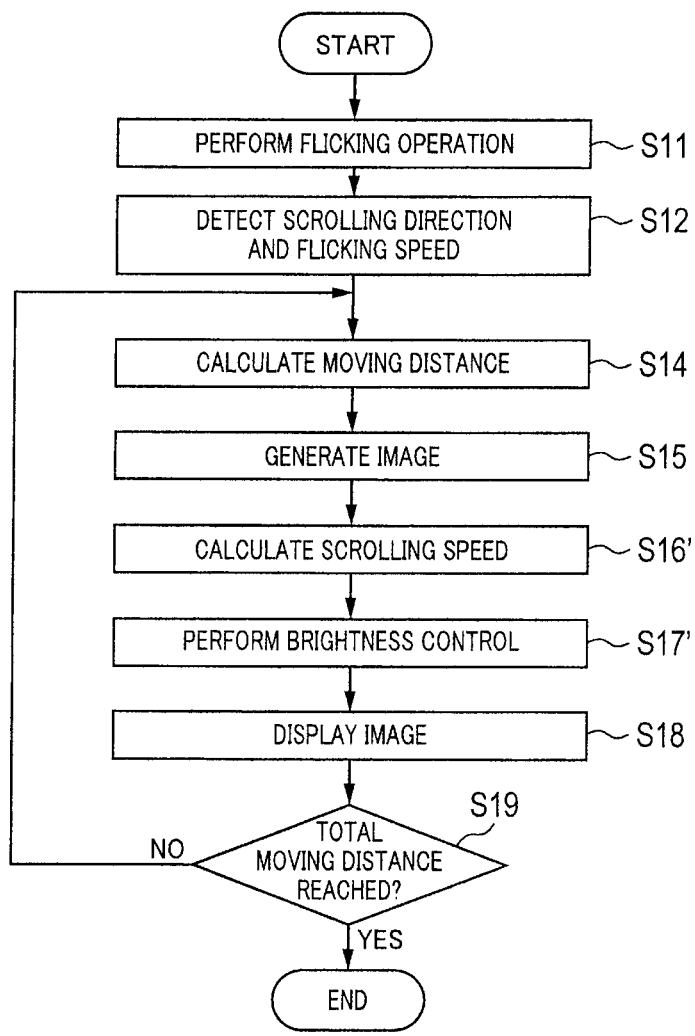
FIG. 6 is a flowchart illustrating an operation example of the portable terminal apparatus according to Embodiment 2 of the present invention.

Next, an operation example of portable terminal apparatus 700 will be described. FIG. 6 is a flowchart illustrating an operation example of portable terminal apparatus 700.

The flow in FIG. 6 is different from the flow in FIG. 3 in that it includes steps S16' and S17' instead of steps S16 and S17. Since the operation other than that in steps S16' and S17' is the same as that in the flow in FIG. 3, the description thereof will be omitted hereinafter.

In step S16', image brightness control section 706 calculates a scrolling speed based on the moving distance and time indicated by the moving distance information. Suppose that the moving distances every time the screen is updated here are Lj, Lk, Ll and Lm just like Embodiment 1. Suppose that times corresponding to those moving distances are also Tj, Tk, Tl and Tm just like Embodiment 1. Image brightness control section 706 calculates a scrolling speed between frames using these values.

Here, an example of calculating the scrolling speed will be described using FIG. 4. When k-th and (k+1)-th frames are taken as an example, image brightness control section 706 calculates the scrolling speed according to $(L(k)-L(k-1))/(T(k)-T(k-1))$. Hereinafter, the case in FIG. 4 will be described as an example. Suppose that j=1, k=2, l=3 and m=4 in the following description as an example. Image brightness control section 706 calculates a scrolling speed between the 0-th frame and j-th frame. That is, image brightness control section 706 calculates $(Lj-0)/(Tj-0)$ and designates the result as a first scrolling speed. Next, image brightness control section 706 calculates a scrolling speed between the j-th frame and k-th frame. That is, image brightness control section 706 calculates $(Lk-Lj)/(Tk-Tj)$ and designates the result as a second scrolling speed. Likewise, image brightness control section 706 calculates a scrolling speed (third scrolling speed) between the l-th frame and k-th frame, a scrolling speed (fourth scrolling speed) between the m-th frame and l-th frame as well. Since the first scrolling speed is highest and the fourth scrolling speed is lowest, image brightness control section 706 instructs image brightness changing section 107 to adjust brightness of images on the whole screen so that the brightness becomes lowest in the j-th frame, and is sequentially lowered from the next frame to reach normal display brightness in the m-th frame. Note that the brightness values included in this instruction are each predetermined.

In step S17', image brightness changing section 107 performs brightness control on the image generated in display image generation section 104 every time the screen is updated based on the instruction of image brightness control section 706. For example, image brightness changing section 107 controls images 302 and 304 to have the lowest brightness. Next, image brightness changing section 107 controls image 305 to brightness higher than that of image 304. Next, image brightness changing section 107 controls image 306 to have brightness higher than that of image 305. Image brightness changing section 107 controls image 307 to brightness higher than that of image 306, that is, the highest brightness. Image brightness changing section 107 sends the images subjected to brightness control processing to display 108 every time the screen is updated.

The operation of portable terminal apparatus 700 has been described so far.

Thus, portable terminal apparatus 700 reduces brightness of an image displayed on the whole screen when the scrolling speed is high during scroll displaying. Thus, portable terminal apparatus 700 can reduce power consumption during scroll displaying. When the scrolling speed is high, images displayed on the whole screen are estimated to have poor visibility to the user and have a low degree of attention. Thus, even when portable terminal apparatus 700 reduces brightness of images displayed on the whole screen, this will not impair the convenience of the user.

Embodiment 3

Embodiment 3 of the present invention will be described. The present embodiment is different from Embodiments 1 and 2 in that a portable terminal apparatus includes two touch panels.

<Shape of Portable Terminal Apparatus 900>

Figure 7:
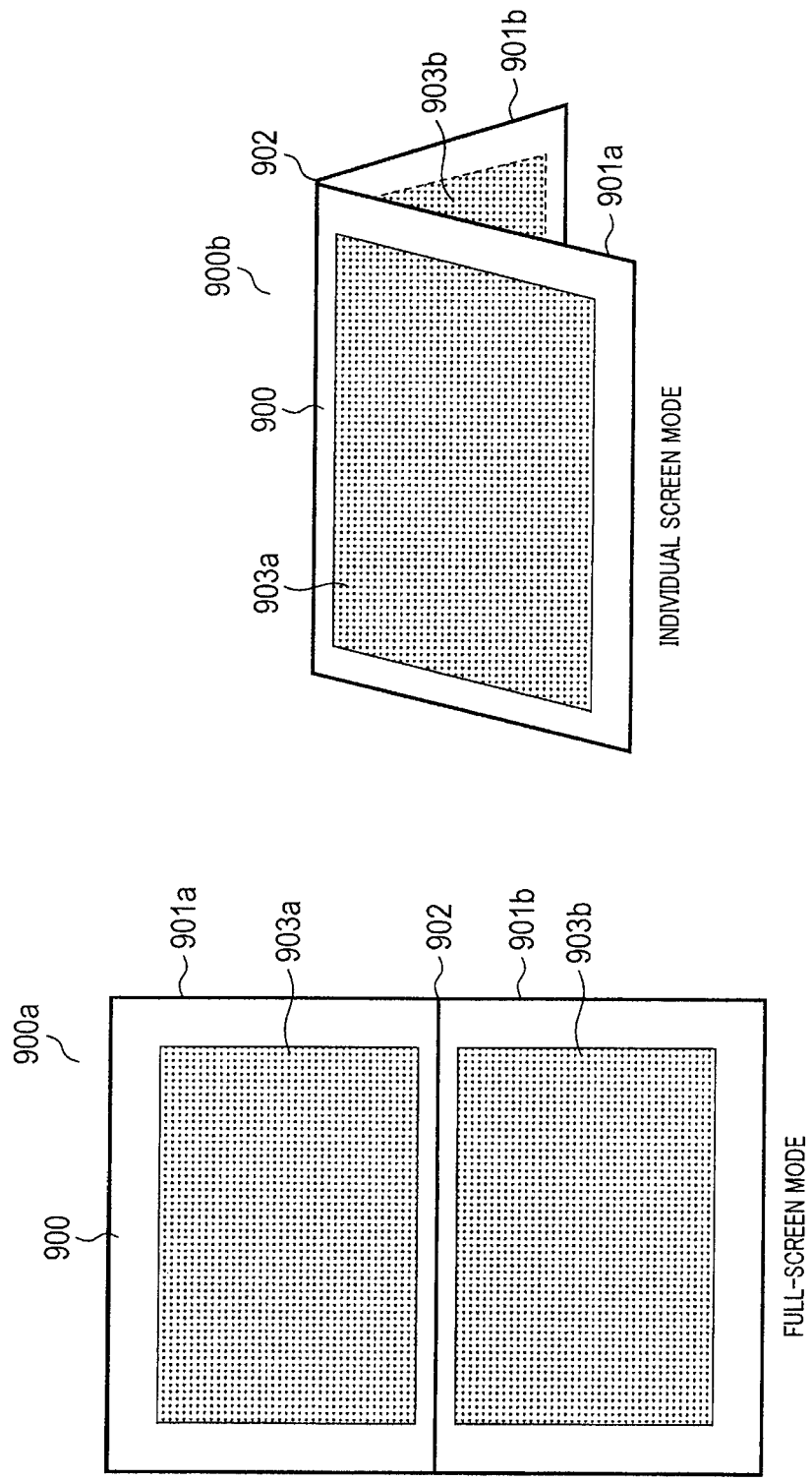
FIG. 7 is an external view illustrating shape examples of a portable terminal apparatus according to Embodiment 3 of the present invention.

First, a shape of portable terminal apparatus 900 according to Embodiment 3 of the present invention will be described. FIG. 7 is a diagram illustrating shape examples of portable terminal apparatus 900 of the present embodiment.

In FIG. 7, portable terminal apparatus 900 includes case 901a provided with display 903a and case 901b provided with display 903b. Case 901a and case 901b rotate via hinge 902. With this rotation, portable terminal apparatus 900 can be transformed from first shape 900a to second shape 900b or from second shape 900b to first shape 900a.

First shape 900a has a shape called "full-screen mode." In the case of this full-screen mode, case 901a and case 901b are horizontally positioned. At this time, display 903a and display 903b jointly function as one screen.

Second shape 900b has a shape called "individual screen mode." In the case of this individual screen mode, case 901a and case 901b form a mountain fold with hinge 902 as a vertex thereof. At this time, display 903a and display 903b function as different screens.

<Configuration of Portable Terminal Apparatus 900>

Figure 8:
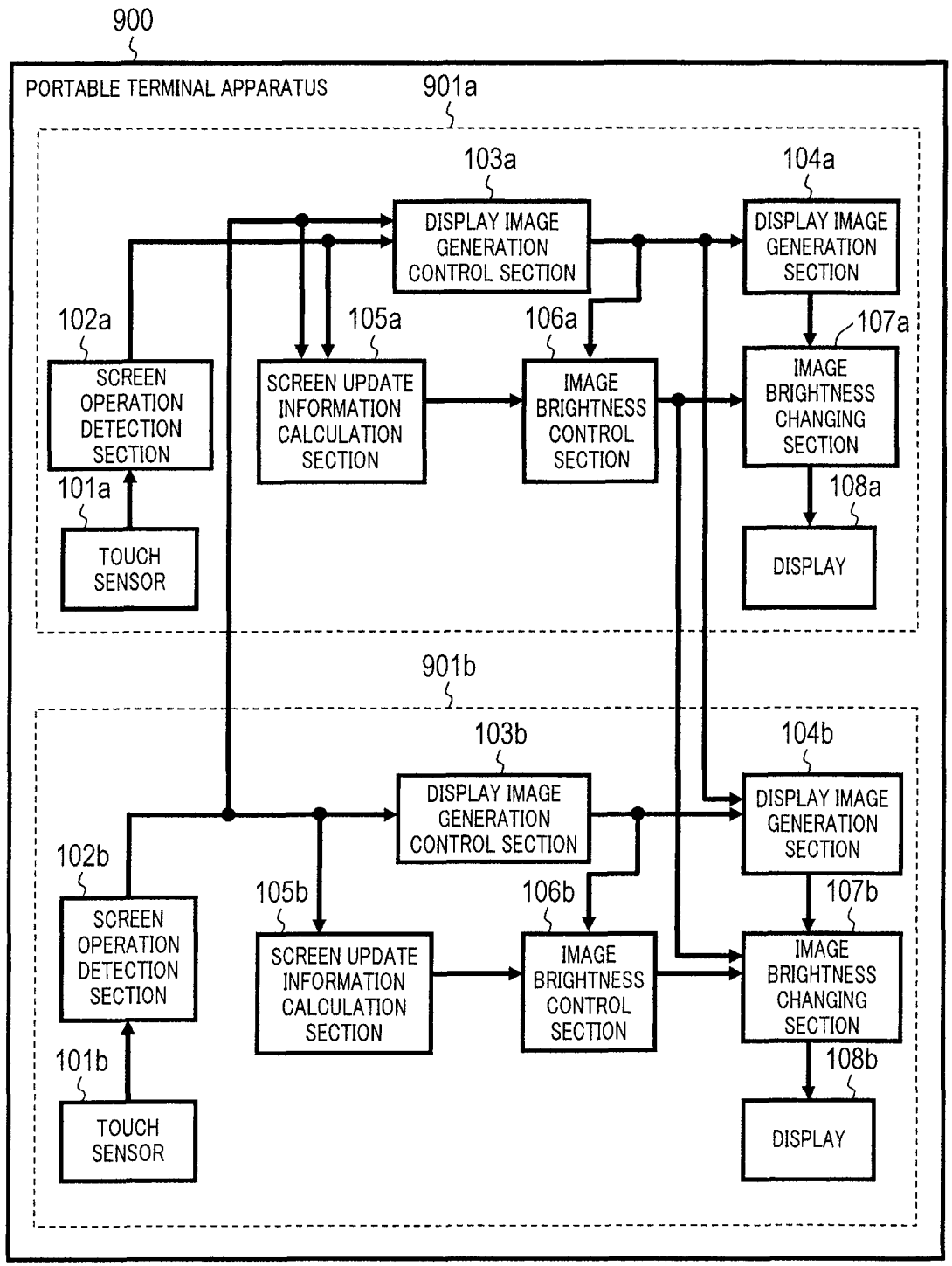
FIG. 8 is a block diagram illustrating a configuration example of the portable terminal apparatus according to Embodiment 3 of the present invention.

Next, a configuration of portable terminal apparatus 900 according to Embodiment 3 of the present invention will be described. FIG. 8 is a block diagram illustrating a configuration example of portable terminal apparatus 900.

In FIG. 8, case 901a and case 901b have the same components and these components are the same as those of portable terminal apparatus 100 in FIG. 1. Therefore, descriptions of those components will be omitted. Note that display 108a corresponds to display 903a in FIG. 7 and display 108b corresponds to display 903b in FIG. 7.

<Operation of Portable Terminal Apparatus 900>

Next, the operation of portable terminal apparatus 900 according to Embodiment 3 of the present invention will be described.

In the case of an individual screen mode, case 901a and case 901b operate independently of each other. This operation is the same as the operation of portable terminal apparatus 100 in FIG. 1 described in Embodiment 1.

In the case of a full-screen mode, in case 901b, display image generation control section 103b, screen update information calculation section 105b and image brightness control section 106b stop operating. On the other hand, in case 901a, display image generation control section 103a, screen update information calculation section 105a and image brightness control section 106a operate. That is, screen operation detection section 102b sends screen operation information to display image generation control section 103a and screen update information calculation section 105a. Furthermore, display image generation control section 103a calculates and sends moving distances of display image generation sections 104a and 104b every time the screen is updated. Furthermore, screen brightness control section 106a calculates and sends brightness control information of respective image brightness changing sections 107a and 107b.

Thus, in portable terminal apparatus 900, case 901a and case 901b individually operate in the case of the individual screen mode, and case 901a and case 901b operate in conjunction with each other in the case of the full-screen mode. Thus, portable terminal apparatus 900 provided with two displays can achieve effects similar to those of Embodiment 1 regardless of whichever mode is in use.

<Variations of Embodiment>

The embodiments of the present invention have been described so far, but the descriptions above are only examples and various modifications can be made thereto. Hereinafter, variations of the embodiments will be described.

Embodiments 1 to 3 above have presented an example in which a contact operation is received by a touch sensor, but the present invention is not limited to this. For example, a sensor that can receive a non-contact operation may be used instead of the touch sensor. The non-contact operation is an operation that is performed by the user near the portable terminal apparatus without contacting the display or the like. However, the non-contact operation also needs to be a quick operation as in the case of contact operation.

Embodiment 1 above has described an example where image brightness control section 106 determines a brightness control region based on the total moving distance and the moving time every time the screen is updated, but the present invention is not limited to this. For example, image brightness control section 106 may determine a brightness control region based on a difference between the total moving time and a moving time from a scroll start every time the screen is updated. More specifically, the brightness control region may be a brightness control region where the moving time from a scroll start reaches 80% of the total moving time.

Embodiment 1 above has described a case where a flicking operation is performed once as an example, but the flicking operation may be performed continuously. In that case, while executing scroll displaying by a flicking operation, portable terminal apparatus 100 performs brightness control for scroll displaying through a subsequent flicking operation. That is, screen operation detection section 102 sends screen operation information (including flicking speed $V_1$, scroll direction) of the subsequent flicking operation to display image generation control section 103 and screen update information calculation section 105 based on the contact operation information from touch sensor 101. Display image generation control section 103 calculates a moving distance every time the screen is updated based on flicking speed $V_1$ and the model function in FIG. 2, for example, and notifies display image generation section 104 and image brightness control section 106 of the moving distance. Screen update information calculation section 105 calculates a total moving distance based on flicking speed $V_1$ and the model function in FIG. 2, for example, and notifies image brightness control section 106 of the total moving distance. Image brightness control section 106 determines a brightness control region based on the total moving distance and the moving distance every time the screen is updated, and notifies brightness changing section 107 of the brightness control region together with a predetermined brightness lowering rate. Brightness changing section 107 controls the brightness of an image of the brightness control region for each image generated in display image generation section 104 based on the brightness lowering rate. Scroll displaying of the image controlled in this way is performed following scroll displaying by a flicking operation performed in advance in display 108. Therefore, portable terminal apparatus 100 can determine the brightness control region and perform control of lowering brightness continuously even when scroll displaying is continued through successive execution of flicking operations.

In Embodiment 1 above, there may be several methods for brightness control that reduces the brightness of an image in a brightness control region (hereinafter referred to as "brightness lowering processing"). An example of the method will be described below.

Figure 9:
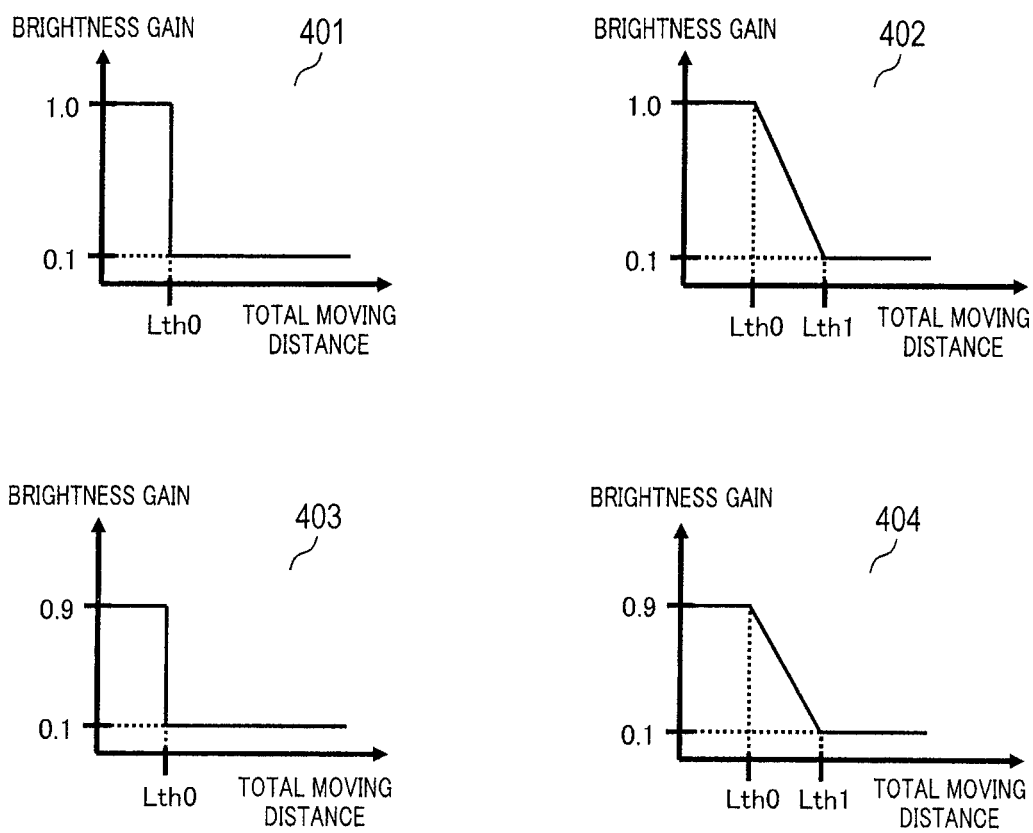
FIG. 9 shows graphs illustrating a relationship between a total moving distance and a brightness gain according to Embodiment 1 of the present invention.

For example, image brightness control section 106 may instruct image brightness changing section 107 to perform brightness lowering processing based on graphs 401 to 404 shown in FIG. 9. In graphs 401 to 404, the horizontal axis represents a total moving distance and the vertical axis represents a brightness gain during brightness lowering processing.

In graphs 401 and 402, when the total moving distance is smaller than predetermined value Lth0, a brightness gain is set to 1.0. That is, in this case, the amount of lowering brightness (hereinafter referred to as "amount of brightness lowering") is assumed to be 0 and brightness lowering processing is not performed. Thus, in this case, image brightness control section 106 may not determine any brightness control region and send brightness control information indicating the intention of not performing brightness lowering processing to brightness changing section 107.

In graphs 403 and 404, when the total moving distance is smaller than predetermined value Lth0, a brightness gain is set to 0.9. That is, in this case, the amount of brightness lowering is set to a value smaller than the case where the total moving distance is equal to or greater than predetermined value Lth0 and brightness lowering processing is barely performed.

In graphs 402 and 404, as the total moving distance between predetermined value Lth0 and predetermined value Lth1 increases, the brightness gain is lowered (the amount of brightness lowering is increased).

Thus, in graphs 401 to 404, when the total moving distance is smaller than predetermined value Lth0, brightness is not lowered at all or barely lowered, thus giving priority to visibility of the user. This is because when the total moving distance is small, the scrolling speed slows down and deterioration of visibility due to scroll displaying is less likely to occur.

Figure 10:
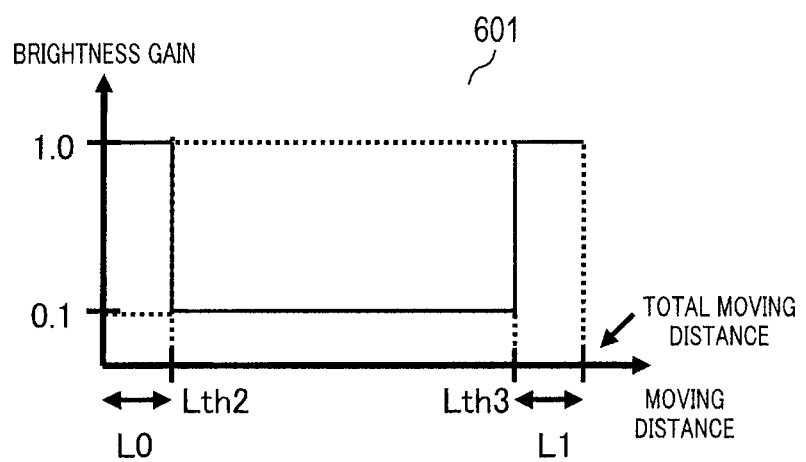
FIG. 10 shows graphs illustrating a relationship between a moving distance and a brightness gain according to Embodiment 1 of the present invention.
Figure 10:
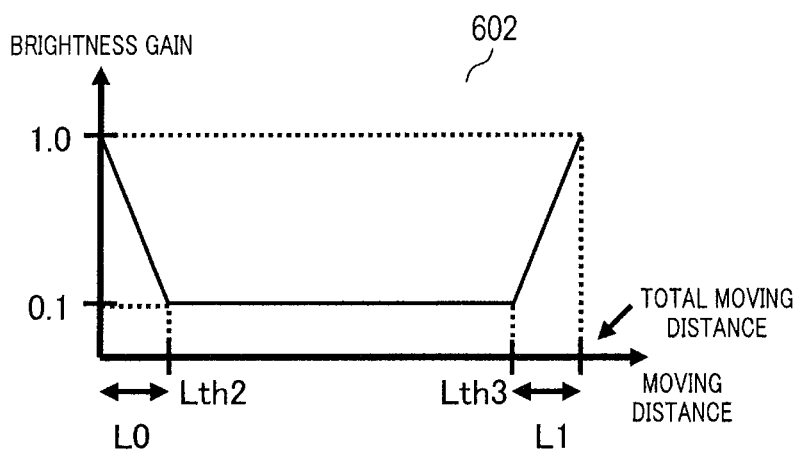

For example, image brightness control section 106 may also instruct image brightness changing section 107 to perform brightness lowering processing based on graphs 601 and 602 shown in FIG. 10. In graphs 601 and 602, the horizontal axis represents a moving distance calculated every time the screen is updated and the vertical axis represents a brightness gain during brightness lowering processing.

In graph 601, when the moving distance is within ranges of L0 and L1, brightness lowering processing is not performed.

In graph 602, when the moving distance is within a range of L0, the brightness gain is lowered (the amount of brightness lowering is increased) as the moving distance increases. In graph 602, when the moving distance is within a range of L1, the brightness gain is increased (the amount of brightness lowering is decreased) as the moving distance increases. L0 shows a range from 0 (scroll start position) to predetermined value Lth2. L1 shows a range from predetermined value Lth3 to a total moving distance (scroll end position).

Thus, in graphs 601 and 602, the amount of brightness lowering is decreased or gradually changed in the vicinity of scroll start-time (L0) and in the vicinity of scroll end-time (L1). This gives priority to keeping the user's visibility without producing extreme brightness changes in a series of images during scroll displaying.

Note that in the graphs in FIG. 9 and FIG. 10, the predetermined values and graph shapes are not limited to the contents described in the drawings, but may be changed based on these graph shapes or may be anything as long as they conform to the above-described contents.

In Embodiment 2 above, portable terminal apparatus 700 in FIG. 5 may be a portable terminal apparatus provided with two cases of the same configuration just like portable terminal apparatus 900 shown in FIG. 7 and FIG. 8.

Figure 11:
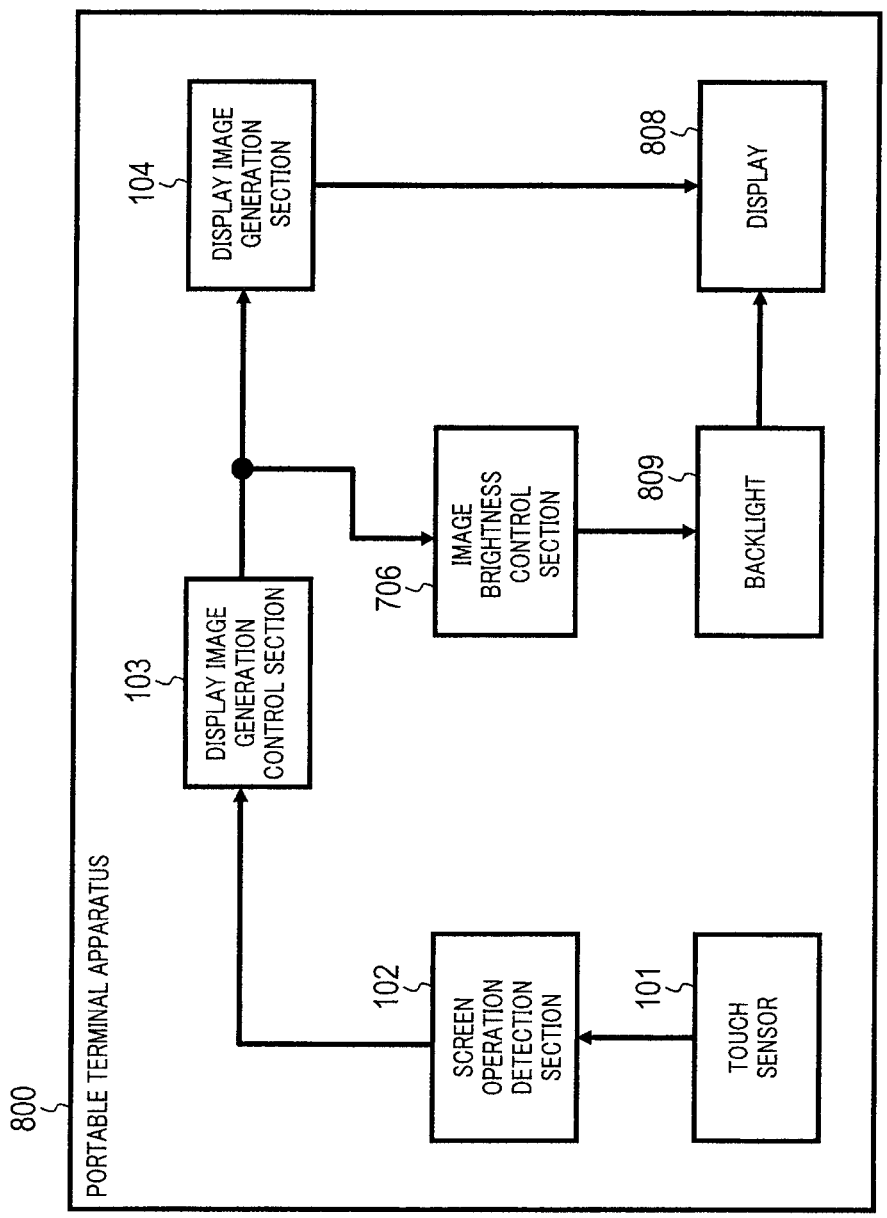
FIG. 11 is a block diagram illustrating a configuration example of the portable terminal apparatus according to Embodiment 2 of the present invention.
Figure 12:
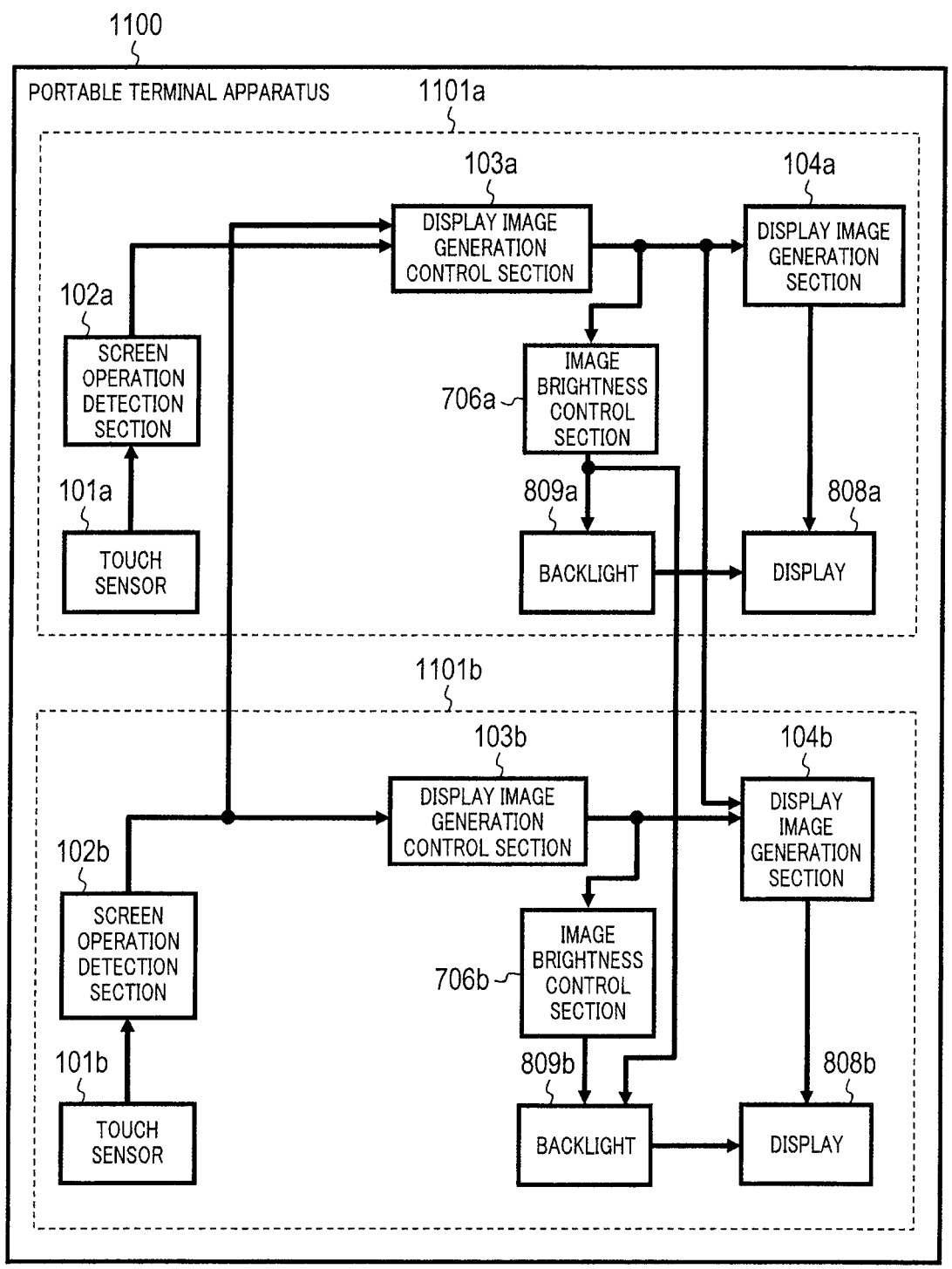
FIG. 12 is a block diagram illustrating a configuration example of the portable terminal apparatus according to Embodiment 2 of the present invention.

In Embodiment 2 above, portable terminal apparatus 700 in FIG. 5 may have a configuration of portable terminal apparatus 800 shown in FIG. 11. In FIG. 11, portable terminal apparatus 800 includes display 808 which is an LCD display and backlight 809 that radiates light onto display 808. Image brightness control section 706 controls brightness of an image displayed on whole display 808 by controlling the light quantity of backlight 809. Note that portable terminal apparatus 800 in FIG. 11 may have a configuration of portable terminal apparatus 1100 shown in FIG. 12.

Figure 13:
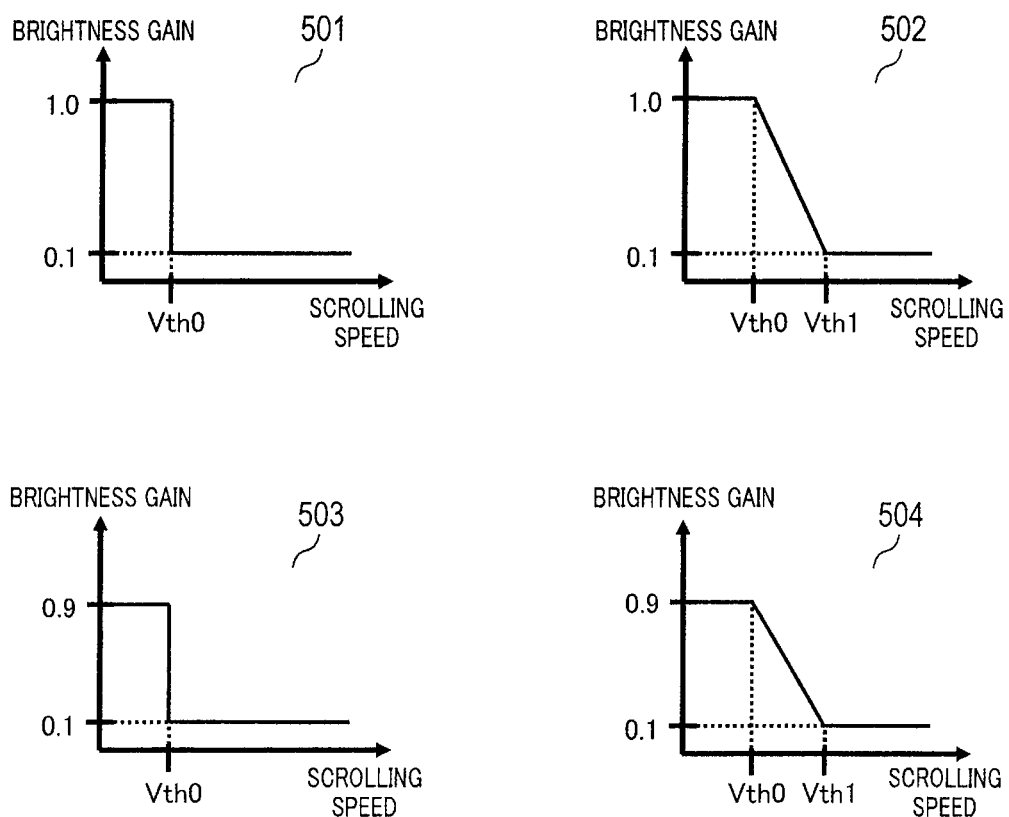
FIG. 13 shows graphs illustrating a relationship between a scrolling speed and a brightness gain according to Embodiment 2 of the present invention.

In Embodiment 2, image brightness control section 706 may instruct image brightness changing section 107 to perform brightness lowering processing based on graphs 501 to 504 shown in FIG. 13. In graphs 501 to 504, the horizontal axis represents a scrolling speed every time the screen is updated and the vertical axis represents a brightness gain during brightness lowering processing.

In graphs 501 and 502, when a scrolling speed is smaller than predetermined value Vth0, the brightness gain is set to 1.0. That is, in this case, the amount of brightness lowering is set to 0 and no brightness lowering processing is performed.

In graphs 503 and 504, when the scrolling speed is smaller than predetermined value Vth0, the brightness gain is set to 0.9. That is, in this case, the amount of brightness lowering is set to a value smaller than that when the scrolling speed is equal to or higher than predetermined value Vth0 and brightness lowering processing is substantially not performed.

In graphs 503 and 504, the brightness gain is decreased (the amount of brightness lowering is increased) as the scrolling speed increases between predetermined value Vth0 and predetermined value Vth1.

Thus, in graphs 501 to 504, when the scrolling speed is smaller than predetermined value Vth0, brightness is not lowered at all or substantially not lowered to give priority to keeping the user's visibility. This is because when the scrolling speed is low, the deterioration of visibility due to scroll displaying is less likely to occur.

A case has been described in foregoing Embodiment 1 to 3 and their variations, where the present invention is configured with hardware by way of example, but the invention may also be provided by software in cooperation with hardware.

As has been described above, a portable terminal apparatus of this disclosure is an apparatus that receives an operation to instruct scrolling of an image displayed on a screen, that moves the image toward an instructed direction and that displays the image, the apparatus including: a determining section that determines whether or not a display image at an end of scrolling is included in a region of the screen during scrolling and that determines, to be a control target region, a region determined not to include the display image at the end of the scrolling of the region of the screen; and a changing section that performs control of lowering brightness of the control target region on the display image during scrolling.

Moreover, the portable terminal apparatus of this disclosure further includes: a detection section that detects a speed of the operation; and a calculation section that calculates a total distance by which the display image at the end of the scrolling moves from start to end of the scrolling and a moving distance by which the display image at the end of the scrolling moves during scrolling based on the operation speed, in which the determining section determines whether or not the display image at the end of the scrolling is included in the region of the screen based on a difference between the total distance and the moving distance during scrolling.

In the portable terminal apparatus of this disclosure, when a subsequent operation instructing new scrolling is received during scrolling by the previously received operation, the detection section detects a speed of the subsequent operation, and the calculation section calculates the total distance and the moving distance during the scrolling based on the speed of the subsequent operation.

In the portable terminal apparatus of this disclosure, when the total distance is smaller than a threshold, the determining section instructs the changing section not to perform control of lowering the brightness.

In the portable terminal apparatus of this disclosure, when the total distance is smaller than a threshold, the determining section determines an amount of lowering the brightness to be a value smaller than that in a case where the total distance is equal to or above the threshold, and the determining section instructs the changing section to perform control of lowering the brightness based on the determined value.

In the portable terminal apparatus of this disclosure, when the total distance is equal to or greater than the threshold, determining section determines an amount of lowering the brightness of the control target region to be a greater value as the total distance increases, and the determining section instructs the changing section to perform control of lowering the brightness based on the determined value.

In the portable terminal apparatus of this disclosure, the determining section instructs the changing section not to perform control of lowering the brightness for a period of time until the moving distance during the scrolling reaches a second threshold from 0 and for a period of time from a third threshold which is greater than the second threshold to the total distance.

In the portable terminal apparatus of this disclosure, the determining section determines an amount of lowering the brightness to be a greater value as the distance increases, for a period of time from 0 until the moving distance during the scrolling reaches a second threshold, the determining section determines the amount of lowering the brightness to be a smaller value as the distance increases, for a period of time until the moving distance during the scrolling reaches the total distance from a third threshold which is greater than the second threshold, and the determining section instructs the changing section to perform control of lowering the brightness based on the determined value.

The portable terminal apparatus of this disclosure includes a plurality of screens, in which the changing section performs, when one image is divided to be displayed on the plurality of screens, control of lowering the brightness on the one image, and the changing section performs, when independent images are displayed on the plurality of screens, respectively, control of lowering the brightness on the independent images.

The portable terminal apparatus of this disclosure is a portable terminal apparatus that receives an operation to instruct scrolling of an image displayed on a screen, that moves the image generated every time the screen is updated toward an instructed direction and that displays the image, the apparatus including a detection section that detects a speed of the operation, a first calculation section that calculates a distance by which an image displayed on a screen at an end of the scrolling moves every time the screen is updated, based on a speed of the operation, a second calculation section that calculates a speed of the scrolling between frames based on the distance every time the screen is updated and a time corresponding to the distance and a changing section that performs, on the image generated every time the screen is updated, control of lowering brightness of the image displayed on the screen as the scrolling speed increases.

A brightness control method of this disclosure is a method performed by an apparatus that receives an operation to instruct scrolling of an image displayed on a screen, that moves the image toward an instructed direction and that displays the image, the method including: determining whether or not a display image at an end of scrolling is included in a region of the screen during scrolling and determining, to be a control target region, a region determined not to include the display image at the end of the scrolling of the region of the screen; and performing control of lowering brightness of the control target region on the display image during scrolling.

A brightness control program of this disclosure is a program causing a computer of an apparatus to execute processing, the apparatus being an apparatus that receives an operation to instruct scrolling of an image displayed on a screen, that moves the image toward an instructed direction and that displays the image, the processing including: determining whether or not a display image at an end of scrolling is included in a region of the screen during scrolling and determining, to be a control target region, a region determined not to include the display image at the end of the scrolling of the region of the screen; and performing control of lowering brightness of the control target region on the display image during scrolling.

The disclosure of Japanese Patent Application No. 2012-269576, filed on Dec. 10, 2012, including the specification, drawings and abstract is incorporated herein by reference in its entirety.

INDUSTRIAL APPLICABILITY

The present invention is useful as a portable terminal apparatus, a brightness control method and a brightness control program for controlling brightness of a screen. The present invention is applicable to information processing apparatuses such as a cellular phone set, tablet and personal computer.

REFERENCE SIGNS LIST

100 Portable terminal apparatus
101, 101a, 101b Touch sensor
102, 102a, 102b Screen operation detection section
103, 103a, 103b Display image generation control section
104, 104a, 104b Display image generation section
105, 105a, 105b Screen update information calculation section
106, 106a, 106b Image brightness control section
107, 107a, 107b Image brightness changing section
108, 108a, 108b Display
200 Graph showing relationship between scroll moving distance and time transition
301 Whole image
302, 304, 305, 306, 307 Start-time image
303 End-time image
305a, 305b, 306a, 306b Image region
401, 402, 403, 404 Graph showing relationship between total moving distance and brightness gain
501, 502, 503, 504 Graph showing relationship between scrolling speed and brightness gain
601, 602 Graph showing relationship between scroll moving distance and brightness gain
700 Portable terminal apparatus
706, 706a, 706b Image brightness control section
800 Portable terminal apparatus
808, 808a, 808b Display
809, 809a, 809b Backlight
900 Portable terminal apparatus
900a First shape
900b Second shape
901a, 901b Case
902 Hinge
903a, 903b Display
1100 Portable terminal apparatus
1101a, 1101b Case

The invention claimed is:

1. A portable terminal apparatus that receives an operation to instruct scrolling of an image displayed on a screen, that moves the image toward an instructed direction and that displays the image, the apparatus comprising:
one or more memories; and
circuitry which, in operation:
 detects a speed of the operation;
 calculates a total distance by which a display image at an end of scrolling moves from start to end of the scrolling and a moving distance by which the display image at the end of the scrolling moves during scrolling based on the operation speed;

judges whether or not the display image at the end of scrolling is included in a region of the screen during scrolling based on a difference between the total distance and the moving distance during scrolling and determines, to be a control target region, a region judged not to include the display image at the end of the scrolling of the region of the screen; and performs control of lowering brightness of the control target region on the display image during scrolling, and for a region of the screen that part of the display image at the end of the scrolling enters, performs control of changing brightness of the region to brightness higher than that of the control target region.

2. The portable terminal apparatus according to claim 1, wherein, when a subsequent operation instructing new scrolling is received during scrolling by the previously received operation, the circuitry further:

detects a speed of the subsequent operation; and calculates the total distance and the moving distance during the scrolling based on the speed of the subsequent operation.

3. The portable terminal apparatus according to claim 1, wherein, when the total distance is smaller than a threshold, the circuitry determines not to perform control of lowering the brightness.

4. The portable terminal apparatus according to claim 1, wherein, when the total distance is smaller than a threshold, the circuitry determines an amount of lowering the brightness to be a value smaller than that in a case where the total distance is equal to or greater than the threshold, and the circuitry performs control of lowering the brightness based on the determined value.

5. The portable terminal apparatus according to claim 1, wherein, when the total distance is equal to or greater than the threshold, the circuitry determines an amount of lowering the brightness of the control target region to be a greater value as the total distance increases, and the circuitry performs control of lowering the brightness based on the determined value.

6. The portable terminal apparatus according to claim 1, wherein the circuitry determines not to perform control of lowering the brightness for a period of time until the moving distance during the scrolling reaches a second threshold from 0 and for a period of time from a third threshold which is greater than the second threshold to the total distance.

7. The portable terminal apparatus according to claim 1, wherein the circuitry determines an amount of lowering the brightness to be a greater value as the distance increases, for a period of time until the moving distance during the scrolling reaches a second threshold from 0, the circuitry determines the amount of lowering the brightness to be a smaller value as the distance increases, for a period of time until the moving distance during the scrolling reaches the total distance from a third threshold which is greater than the second threshold, and the circuitry determines to perform control of lowering the brightness based on the determined value.

8. The portable terminal apparatus according to claim 1, comprising a plurality of screens, wherein the circuitry performs, when one image is divided to be displayed on the plurality of screens, control of lowering the brightness on the one image, and the circuitry performs, when independent images are displayed on the plurality of screens, respectively, control of lowering the brightness on the independent images.

9. A brightness control method performed by an apparatus that receives an operation to instruct scrolling of an image displayed on a screen, that moves the image toward an instructed direction and that displays the image, the method comprising:

detecting a speed of the operation;

calculating a total distance by which a display image at an end of scrolling moves from start to end of the scrolling and a moving distance by which the display image at the end of the scrolling moves during scrolling based on the operation speed;

judging whether or not the display image at the end of scrolling is included in a region of the screen during scrolling based on a difference between the total distance and the moving distance during scrolling and determining, to be a control target region, a region judged not to include the display image at the end of the scrolling of the region of the screen; and performing control of lowering brightness of the control target region on the display image during scrolling, and for a region of the screen that part of the display image at the end of the scrolling enters, performing control of changing brightness of the region to brightness higher than that of the control target region.

10. A non-transitory recording medium storing a computer program to be executed by a computer of an apparatus, the apparatus being an apparatus that receives an operation to instruct scrolling of an image displayed on a screen, that moves the image toward an instructed direction and that displays the image, the computer program causing the computer of the apparatus to:

detect a speed of the operation;

calculate a total distance by which a display image at an end of scrolling moves from start to end of the scrolling and a moving distance by which the display image at the end of the scrolling moves during scrolling based on the operation speed;

judge whether or not the display image at the end of scrolling is included in a region of the screen during scrolling based on a difference between the total distance and the moving distance during scrolling and determine, to be a control target region, a region judged not to include the display image at the end of the scrolling of the region of the screen; and perform control of lowering brightness of the control target region on the display image during scrolling, and for a region of the screen that part of the display image at the end of the scrolling enters, perform control of changing brightness of the region to brightness higher than that of the control target region.

* * * * *